(12) United States Patent
Dubief et al.

(10) Patent No.: US 10,555,635 B2
(45) Date of Patent: Feb. 11, 2020

(54) CONNECTOR FOR REFILLING CONTAINER AND BEVERAGE DISPENSER

(71) Applicant: NESTEC S.A., Vevey (CH)

(72) Inventors: Flavien Dubief, Champagne (CH); Marco Iotti, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 185 days.

(21) Appl. No.: 15/546,051

(22) PCT Filed: Jan. 18, 2016

(86) PCT No.: PCT/EP2016/050869
§ 371 (c)(1),
(2) Date: Jul. 25, 2017

(87) PCT Pub. No.: WO2016/120105
PCT Pub. Date: Aug. 4, 2016

(65) Prior Publication Data
US 2018/0008086 A1    Jan. 11, 2018

(30) Foreign Application Priority Data

Jan. 29, 2015  (EP) .................................. 15153053

(51) Int. Cl.
*A47J 31/40* (2006.01)
*B65D 75/58* (2006.01)
*A47J 31/44* (2006.01)
*B65B 1/06* (2006.01)

(52) U.S. Cl.
CPC ......... *A47J 31/404* (2013.01); *A47J 31/4403* (2013.01); *B65B 1/06* (2013.01); *B65D 75/5877* (2013.01)

(58) Field of Classification Search
CPC .... A47J 31/404; A47J 31/407; A47J 31/4403; A47J 31/44; B65B 1/06; B65D 75/5877
USPC ......................................................... 141/383
See application file for complete search history.

(56) References Cited

U.S. PATENT DOCUMENTS

| | | | | |
|---|---|---|---|---|
| 4,752,807 A * | 6/1988 | Mort | .................... | G03G 15/087 141/319 |
| 4,942,432 A * | 7/1990 | Mort | .................. | G03G 15/0881 141/319 |
| 5,425,404 A * | 6/1995 | Dyer | .................... | B67D 3/0012 141/21 |
| 5,472,026 A * | 12/1995 | Herbst | ............... | G03G 15/0865 141/18 |

(Continued)

FOREIGN PATENT DOCUMENTS

| DE | 102011017509 | 10/2012 |
|---|---|---|
| EP | 1088764 | 4/2001 |

(Continued)

*Primary Examiner* — Timothy L Maust
*Assistant Examiner* — James R Hakomaki
(74) *Attorney, Agent, or Firm* — K&L Gates LLP

(57) ABSTRACT

A connector for connecting a powder refilling container including at least one flexible wall with a storing powder tank of a beverage preparation machine wherein the connector is a tube, the tube presenting two ends, one first end being configured for piercing the flexible wall of the powder refilling container and for being attached to the flexible wall, and one second end being configured for being attached to the powder inlet of the storing tank.

12 Claims, 11 Drawing Sheets

(56) References Cited

U.S. PATENT DOCUMENTS

| | | | |
|---|---|---|---|
| 5,967,197 A * | 10/1999 | Shown | B65B 3/06 |
| | | | 141/114 |
| 6,250,506 B1 | 6/2001 | Geiger et al. | |
| 6,378,730 B1 * | 4/2002 | Reddy | B67B 7/26 |
| | | | 222/541.9 |
| 6,868,988 B2 * | 3/2005 | Ufheil | A47J 31/404 |
| | | | 222/129.1 |
| 6,938,801 B1 * | 9/2005 | Reddy | B67D 1/0007 |
| | | | 222/132 |
| 8,844,768 B2 * | 9/2014 | Veltrop | B67D 3/0083 |
| | | | 222/132 |
| 8,887,960 B2 * | 11/2014 | Hardman | B67D 7/02 |
| | | | 222/132 |
| 2008/0110935 A1 * | 5/2008 | Huber | A47J 31/404 |
| | | | 222/221 |
| 2012/0248143 A1 * | 10/2012 | Gigandet | A47J 31/404 |
| | | | 222/71 |
| 2015/0136272 A1 * | 5/2015 | Brenneis | B65B 37/02 |
| | | | 141/69 |
| 2018/0008084 A1 * | 1/2018 | Dubief | A47J 31/44 |
| 2018/0008085 A1 * | 1/2018 | Dubief | A47J 31/40 |

FOREIGN PATENT DOCUMENTS

| | | |
|---|---|---|
| JP | 0619542 | 7/1994 |
| JP | 08198281 | 8/1996 |
| WO | 9101923 | 2/1991 |
| WO | 201014142 | 1/2013 |

* cited by examiner

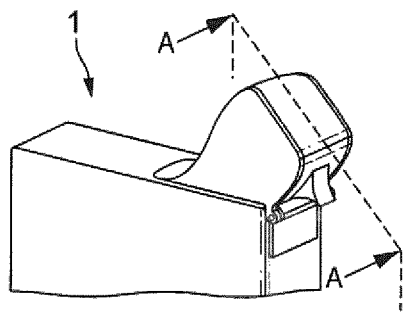
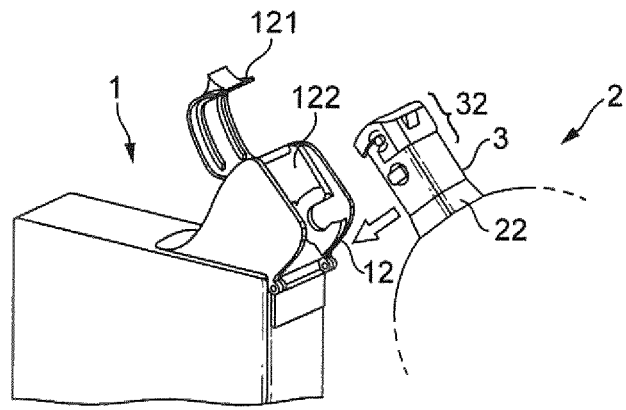
FIG. 9a    FIG. 9b
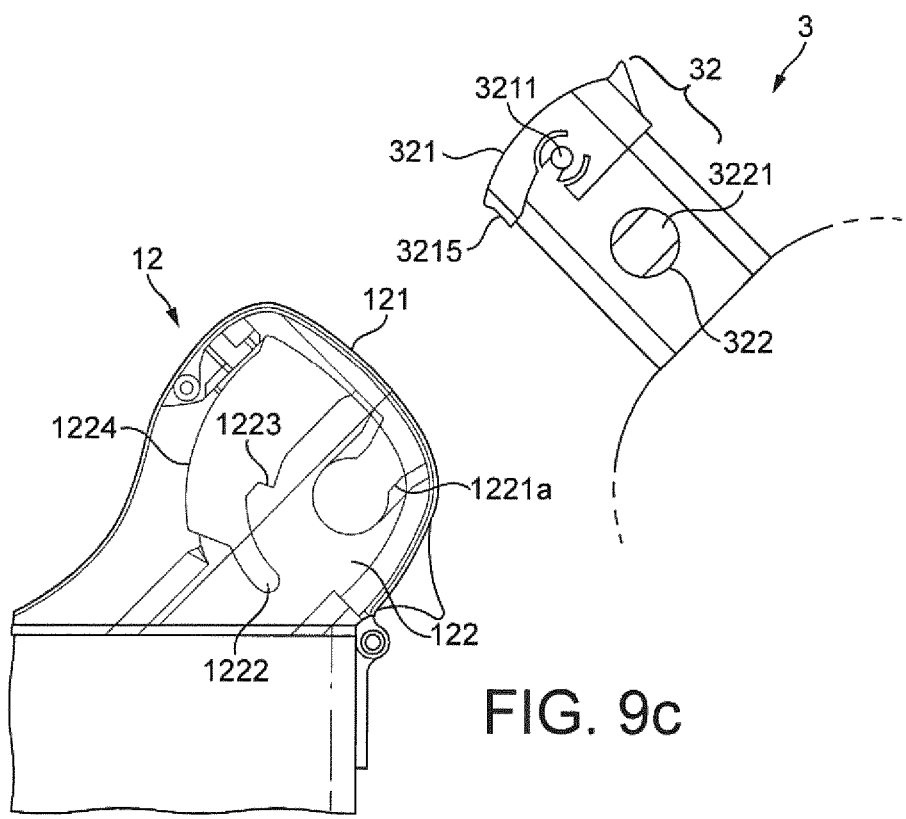
FIG. 9c

CONNECTOR FOR REFILLING CONTAINER AND BEVERAGE DISPENSER

CROSS REFERENCE TO RELATED APPLICATIONS

The present application is a National Stage of International Application No. PCT/EP2016/050869, filed on Jan. 18, 2016, which claims priority to European Patent Application No. 15153053.2, filed on Jan. 29, 2015, the entire contents of which are being incorporated herein by reference.

FIELD OF THE INVENTION

The present invention relates to beverage dispensers preparing beverages from a soluble powder stored in a container and from which a dose of powder is dispensed to prepare a beverage.

BACKGROUND OF THE INVENTION

Many beverages like espresso and other coffee beverages, milk beverages, chocolate beverages are prepared by mixing a beverage soluble powder with a diluent. Mixing devices are known for speedier preparation of such beverages by mixing the beverage soluble powder with the diluent, such as water. These devices can comprise a dissolution chamber in which the soluble component and the diluent are fed. The diluent can be introduced into the dissolution chamber in order to create a whirlpool to efficiently dissolve the soluble powder in the hot water or the hot diluent can be introduced under the form of jets that provides mixing, dissolving and frothing. The mixture can also eventually be frothed by a whipper in the dissolution chamber to reconstitute the beverage and produce foam. The beverage is then usually evacuated into a receptacle for drinking. These devices can also mix the beverage soluble powder with the diluent in a drinking cup, usually a single use cup. In that case the soluble food component is introduced in the cup and the diluent is introduced under the form of jets that provides mixing, dissolving and/or frothing.

Whatever the way the powder and the diluent are mixed together the beverage soluble powder is usually stored in a tank placed above the dissolution chamber opened mouth and a dosing device like a screw or an auger doses and delivers the beverage soluble powder which falls in the dissolution chamber or the drinking cup. Diluent is simultaneously fed to the dissolution chamber so that dissolution occurs.

The tank storing the food or beverage powder comprises a tank with a removable lid at the top. The tank can be refilled with powder by removing the lid and replenishing the tank. This operation is usually implemented by means of simple packaging of food of beverage powder. The top of the packaging is cut or torn and the powder is emptied in the tank.

This current practice present several disadvantages.

First the refilling can be very messy because powder can flow around the tank during the operation of transfer. If the operator manipulating the packaging is clumsy, the place inside or around the machine can very rapidly becomes messy and dirty with the difficulty to efficiently removes powder and makes the place proper.

Secondly beverage dispensers often comprise several food or beverage tanks comprising different powders for preparing different beverages. For example, beverage dispensers often comprise an instant coffee powder tank and a milk powder tank. It is important to refill the containers with always the same powder for different reasons. One reason is that no powder must be contaminated by other types of powders in order to not affect the final taste of the beverage ordered by the customer.

Another reason is that usually each tank is associated to a specific dosing device and the dosing device associated to one tank is set for dosing a particular amount of a particular powder in order to provide the expected dissolution with the diluent. Erroneously refilling a tank with a wrong powder leads to an incorrect preparation of the beverage by the dispenser.

There is a need for improving the refilling of powder tanks within a beverage dispenser.

An object of the present invention is to provide a device for enabling the refill of a tank for storing powder in a beverage dispenser with a disposable container.

It would be advantageous to provide a device that limits the spilling of powder during refilling.

It would be advantageous to provide a device that avoids the risk of erroneous refilling of powder containers.

It would be advantageous to provide a device that enables the use of current existing disposable refilling containers, preferably pouches, in order to be able to use the existing manufacturing lines of containers, that is to avoid developing a new type of packaging.

SUMMARY OF THE INVENTION

In a first aspect of the invention, there is provided a connector for connecting a powder refilling container comprising at least one flexible wall with a storing powder tank of a beverage preparation machine wherein the connector is a tube, said tube presenting two ends,
  one first end being configured for piercing the flexible wall of a powder refilling container and for being attached to said wall, and
  one second end being configured for being introduced in a receiving area of the powder inlet of a storing tank.

Generally the connector is adapted for connecting a powder refilling container, preferably a pouch, with the tank for storing a food or beverage powder, said tank being part of a beverage dispenser.

This tank within the beverage dispenser is generally non disposable. Depending on the configuration of the dispenser, the tank can be removed from the dispenser, for example for maintenance or cleaning, and eventually for refilling.

The tank comprises a powder outlet, generally positioned at its bottom.

Preferably the tank is a storing and dosing tank. Therefore it comprises a dosing device, generally positioned at the bottom of the tank and delivering a dose of powder through the powder outlet of the tank. The dosing device can be a rotatable volumetric dosing device like an endless screw or, alternatively, a helicoidal spring, also known as spring auger.

The tank with a dosing device is usually configured for enabling the connection of the dosing device with a motorized shaft at the rear end of the tank, said shaft being part of the beverage dispenser.

According to another embodiment the dosing device is not part of the tank. In that embodiment the dosing device can be part of the beverage dispenser and the tank is a simple storing tank that comprises a powder outlet for dispensing powder to a dosing device within a beverage dispenser. In this embodiment, preferably, the powder outlet comprises a device enabling the opening of the outlet of the tank during dosing operation.

Generally the storing chamber of the tank presents globally the shape of a parallelepiped. It usually presents two lateral walls and two end walls, usually one rear end wall and one front end wall. The walls extend between the bottom and the top of the storing chamber and are essentially vertical. By essentially vertical it is meant that some parts of the walls can be inclined, generally to create a funnel above the bottom of the tank. For example, when the tank comprises an endless dosing screw at its bottom, the inclination of the walls increases the storing volume of the storing chamber above the screw and creates a funnel that guides powder to the screw.

The top of the tank is closed by a lid. The lid can be a removable lid in order to be able to clean the tank or for maintenance of the dosing device for example.

Generally the powder refilling container for refilling the tank with powder is a disposable container. It is preferably a pouch, usually made of flexible film sheets.

The invention provides a connector for connecting the tank and the powder refilling container. The connector is a tube presenting one first end configured for piercing the flexible wall of the powder refilling container and for being attached to said wall. Generally the tube is essentially straight.

Optionally the tube can be slightly angled at one end, preferably at the first end configured for being attached to the powder refilling container. Generally the presence and the angle of the bend in the tube depends on the shape of the powder refilling container and/or the position of the area of the flexible wall to be pierced by the connector as will be explained later.

Accordingly said first end enables the creation of a powder outlet in the wall of the container and the attachment of the connector tube to said powder outlet simultaneously or subsequently to piercing.

Usually the connector is configured for being attached to the wall around the area pierced by the connector in the flexible wall.

Preferably the first end of the tube comprises a piercing portion, said piercing portion comprising a tip end.

Consequently said tip end can improve the piercing of the wall.

According to a preferred embodiment the tip end can be supported by ribs, said ribs joining at the tip end.

According to another embodiment, the tip end can result from an inclined tube slicing.

Preferably the first end of the tube comprises an attaching portion presenting a shape designed for cooperating with a corresponding attaching element on the wall of the powder refilling container.

In particular such an attaching portion can comprise a design enabling bayonet type engagement, screwing type engagement and/or snap-fitting engagement.

Apart from the design, magnet(s) and metallic part(s) can be present to improve the operator's feeling during connection.

The tube of the connector presents one second end configured for being introduced in a receiving area of the powder inlet of a storing tank.

Accordingly the connector attached by the first end of the tube to the powder refilling container can be connected to the tank by the second end of the tube and can create a connection between the refilling container and the tank.

The second end of the tube of the connector is preferably designed:
  for being received in a receiving area of the powder inlet of the storing tank, and
  once received in said receiving area, for being movable within said receiving area in order to be positioned relatively to the powder inlet of the tank in at least two positions:
    one first position in which the second end of the tube is oriented upwardly, and
    one second position in which the second end of the tube is oriented downwardly.

Accordingly in the first position, the connection is created but the powder does not flow through the tube of the connector to the storing tank because, due to the upwardly orientation of the tube, the powder stays in the container by gravity. This position enables the operator to correctly connect the connector attached to the powder refilling container with the powder inlet of the tank without any risk that powder may fall around because powder is not induced to flow through the tube.

And, accordingly, once the second end of the tube is positioned in the second position, a downwardly oriented flow path is created for powder and powder can flow from the powder container to the tank by gravity.

Generally the flow path created in the second position is essentially straight.

Preferably the flow path is essentially downwardly orientated from the second end of the connector to the powder inlet of the tank. In the second position the flow path can present an angle of at most 60° with vertical, preferably at most 45°. The value of the angle can depend on the nature of the powder and its flowability.

Generally the powder inlet and its receiving area are fixed and the connector only is movable relatively to the powder inlet and its receiving area.

Preferably the second end of the tube is designed so that:
  the second end of the tube is able to be received in the powder inlet of the tank if said second end is oriented upwardly only,
  once received in the powder inlet of the tank, the second end of the tube is able to move relatively to the powder inlet of the tank to be oriented downwardly.

Accordingly the operator is induced to hold the second end of the tube upwardly oriented—according to the sense of powder from the powder refilling container to the tank—when he/she connects the connector to the powder inlet of the tank, and powder is prevented from falling from said connector during the connecting operation.

Generally the second end of the tube moves from the first position to the second position according to a rotation inside the powder inlet of the tank.

In practice, the first end of the connector has been previously attached to a powder refilling container, and as the tube moves from the first position to the second position, the operator is induced to hold the powder refilling container above the powder storing tank, urging powder to flow by gravity through the tube.

According to one mode the second end of the tube is introduced in the powder inlet of the tank according to an upwardly translation up to the first position.

Accordingly the operator is induced to move the second end of the tube upwardly during the step of connection of the second end of the tube with the powder inlet of the tank, and for this reason, powder is prevented from falling from the second end of the tube during this operation.

According to a less preferred mode the second end of the tube can be introduced in the powder inlet of the tank according to a downwardly translation down to the first position, the second end of the tube being orientated upwards.

Accordingly the second end of the tube is orientated upwards and powder is prevented from falling from the second end of the tube during this operation.

According to the preferred embodiment the second end of the tube comprises means for enabling:
 the introduction of the second end of the tube in the receiving area of the tank to the first position, and
 the rotational movement of the second end of the tube from the first to the second position.

Usually this means for introduction and the rotational movement comprises mechanical shapes.

Preferably the external wall of the tube comprises at least one guiding groove and/or pin designed for guiding the tube in the receiving area of the powder inlet of the storing tank and for moving the tube in the receiving area.

Preferably the tube comprises two pairs of symmetric pins on its external sides.

Preferably the second end of the tube of the connector is also designed so that, once it is in the second position, it cannot be removed from the receiving area of the powder inlet without moving back first to the first position.

Consequently, the second end of the tube is oriented upwardly when it is removed from the receiving area and there is no risk that powder falls from the outlet.

The connector can comprise a removable cover above the second end of the tube.

According to one mode, the removable cover can be configured to be completely detached from the second end, for example as a screwed cap. The operator can manually completely remove the cover before the refilling operation.

According to another mode the second end of the tube can comprise a removable cover, said cover being permanently attached to the packaging, and the connection between the second end of the tube and the powder inlet of the tank can be designed so that:
 in the first position, the cover closes the second end of the tube,
 in the second position, the cover is removed from the second end of the tube.

Preferably the removal of the cover from the second end of the tube results from the movement of the second end of the tube from the first position to the second position. As an example, the receiving area of the powder inlet of the tank can present a design comprising a cover retaining means, like a lip or an obstacle holding the removable cover during the movement of the second end from the first position to the second position.

According to one mode the connector can be disposable and used for refilling a tank with one powder refilling container. According to said mode, the connector does not have to be removably attached to the powder refilling container.

According to another mode the connector can be reusable and used for refilling a tank with several refilling containers. According to said mode, the connector can be removably attached to the powder refilling container, for example by a bayonet or screwing engagement.

In a second aspect of the invention, there is provided a powder refilling container made of at least one flexible wall and connectable to the connector such as described above, said flexible wall comprising a tearable area, and said powder refilling container comprising an attaching element configured for cooperating with the first end of the connector, said attaching element surrounding the tearable area of the flexible wall, and said container comprising powder.

The flexible wall of the container is preferably made of a multilayer film, preferably made of at least one metallic film and one plastic film.

According to the preferred embodiment the container is a pouch made of one flexible film material.

According to one embodiment, the tearable area on the flexible wall can comprise weakened lines to improve piercing, in particular lines extending radially from the centre of the area.

If the film is multi-layered, perforation or cutting lines can be present in at least one of the layers the flexible wall is made of.

Preferably the attaching element of the powder refilling container is a ring, the bottom surface of said ring being sealed to the flexible wall of the refilling container in order to surround the tearable area and said ring being designed for cooperating the first end of the connector.

Preferably the bottom surface of the ring is flat in order to improve attachment to the flexible wall. The ring can be attached to the wall by glue, heating, ultrasound welding or any other known methods.

According to a particular embodiment, the attaching element can be fixed to the powder refilling container by cooperation with a fixing element on the inner side of the powder refilling container, the flexible wall being sandwiched between the attaching element and the fixing element.

Preferably the ring is designed to enable cooperation with the connector by a bayonet type engagement, a screwing type engagement and/or snap-fitting engagement. Therefore the design of the ring can comprise a slot, a pin, a screw.

Apart from the design, magnet(s) and metallic part(s) can be present to improve the operator's feeling during connection.

Preferably the ring is annular.

Preferably the powder refilling container is a pouch. The manufacture of such pouch is comparable to the manufacture of current existing powder pouches except that the pouch comprises a tearable area and attaching element.

The tearable area can be created by weak perforation at the upper surface of the film the pouch is made of and the attaching element can be attached around this area by common attaching technologies.

Accordingly the invention provides a pouch that does not require the building of a new dedicated manufacturing line: existing pouch manufacturing line can be used. The upper surface of the film used for manufacturing the pouch can be perforated before making and filling the pouch. The attaching element can be attached in a final manufacturing step, for example with glue, or in a precedent step, in the case of cooperation with a fixing element.

The powder refilling container can be any other type of container than a pouch with the condition that it comprises at least one flexible wall with a tearable area and an attaching element configured for cooperating with the first end of the connector, said attaching element surrounding the tearable area of the flexible wall. For example, the container can present a main rigid body, said body comprising an opening closed by a flexible wall with a tearable area, and said opening being designed for being the attaching element cooperating with the first end of the connector. In such an example, the main rigid body can be a plastic bottle, of which opening is closed by a flexible wall with a tearable area.

Preferably the powder refilling container comprises a food or beverage forming powder.

In a third aspect there is provided a beverage dispenser comprising at least one tank for storing food or beverage powder, said tank being connectable to the connector described above, wherein the tank comprises a powder inlet, wherein the power inlet of the tank comprises a receiving area for receiving the second end of the tube of the connector, said receiving area being designed so that so that the tube of the connector is able to be moved within said receiving area in order to be positioned relatively to the powder inlet of the tank in at least two positions:

in the first position so that the tube is oriented upwardly,
in the second position so that the tube is oriented downwardly.

Preferably the receiving area of the tank comprises means for enabling the rotational movement of the connector from the first to the second position.

Preferably the receiving area of the tank is a socket, the internal walls of said socket comprising at least one guiding pin and/or groove for cooperation with at least one corresponding guiding groove and/or pin on the external wall of the second end of the tube of the connector.

Preferably the receiving area comprises at least two pairs of symmetric guiding grooves on its internal walls.

According to one embodiment the dispenser can comprise at least two tanks storing different food or beverage powders and the receiving areas of the powder inlets of the tanks are designed differently for being connected to different connectors, said connectors being connected to different containers storing different powders.

In a fourth aspect, there is provided a system for refilling storing tanks of a beverage dispenser with powder, said system comprising:

at least one connector such as described above,
powder refilling containers such as described above,
a beverage dispenser such as described above.

As mentioned above, the second end of the tube of the connector and the receiving area of the powder inlet of the tank are designed so that the second end of the tube can be introduced in the receiving area, and, once introduced in said receiving area, for being movable within said receiving area in order to be positioned relatively to the powder inlet of the container in at least two positions:

one first position in which the second end of the tube is oriented upwardly,
one second position in which the second end of the tube is oriented downwardly.

Preferably, the external wall of the tube of the connector comprises two pairs of symmetric pins on its external sides and the receiving area comprises at least two pairs of symmetric guiding grooves on its internal walls, one first pair of symmetric pins cooperating with one first pair of guiding grooves when the second end of the tube of the connector is introduced in the receiving area to the first position, and one second pair of symmetric pins cooperating with one second pair of guiding grooves when the second end of the tube of the connector is moved to the second position Preferably, the first and second pairs of guiding grooves are designed essentially transversely one to the other. Accordingly, when the second end of the tube of the connector is in the second position, it cannot be directly removed from the receiving area without moving back to the first position, urging the operator to orientate the outlet of the tube upwardly with no risk of powder leaking.

In alternative embodiments:
the external wall of the tube of the connector can comprise at least one pair of guiding grooves and the external wall of the receiving area of the powder inlet can comprise at least one corresponding pair of pins, or
both external walls of the tube and internal walls of the receiving area can comprise a pair of guiding grooves and a pair of guiding pins.

Preferably the storing tanks of the dispenser store different types of powders, wherein:
the storing tanks storing different powders present different receiving areas,
the powder refilling containers storing different powders present different attaching elements,
the system comprises different connectors, said connectors differing by their designs so that each connector can connect a dedicated type of powder refilling container to a dedicated storing powder tank only.

According to one mode:
the receiving areas of the storing tanks can differ by theirs colours,
the attaching elements of the powder refilling containers differ by theirs colours,
the connectors differ by their colours,
and one colour is dedicated to one type of powder.

Accordingly the operator is induced to attach one coloured connector with the powder refilling container presenting the attaching element of same colour and to connect the assembly of the container and the connector to the tank presenting the receiving area with the same colour.

According to a second mode:
the receiving areas of the storing tanks storing differ by their shapes,
the attaching elements of the powder refilling containers differ by theirs shapes,
the connectors differ by the shapes of their first ends and their second ends.

Accordingly the operator can attach one connector with the refilling container presenting the attaching element presenting the design cooperating with the connector first end and to connect the assembly of the container and the connector to the tank presenting the receiving area presenting the same design cooperating with the connector second end.

Both above modes can be combined.

Accordingly the system avoids powder cross-contamination in the tanks of the beverage dispenser since it guarantees that a tank can be refilled with one type of connector only and said connector can be connected to one type of powder refilling container only.

If the connector is not disposable and can be reused, the system guarantees that the connector is dedicated to the refill of one type of powder only and cannot be traversed by another powder.

According to a fifth aspect, there is provided a range of connectors such as described above wherein said connectors differ by the designs of their first end and their second end so that each connector can be attached to a dedicated type of powder refilling container only and be connected to a dedicated storing powder tank only.

According to a sixth aspect, there is provided a range of powder refilling containers such as described above wherein said containers differ by the nature of the powders they comprise and by the design of the attaching element so that each container can receive a dedicated connector only.

According to a seventh aspect there is provided a method for refilling a tank for storing powder of a system such as described above wherein the following steps are implemented:

the first end of the connector is attached to the powder refilling container, then the second end of the connector is introduced in the receiving area of the tank to the first position, then the second end of the connector is moved in the receiving area of the tank to the second position.

Preferably the second end of the tube of the connector is oriented upwardly in the first position, and then the second end of the tube is oriented downwardly.

Preferably the powder outlet of the packaging is rotated between the first and the second positions.

Then for stopping the refilling of the tank, the following steps are implemented:

the second end of the connector positioned in the second position is oriented upwardly up to the first position, and the connector is removed from the powder inlet of the container.

Accordingly the removal corresponds to the inversed movements of the connection.

The method presents the advantage of enabling properly stopping of the filling of the container even if powder remains in the powder refilling container. The operator is induced to always orientate the second end of the connector upwardly when the connector is removed from the powder inlet of the container. During this movement, powder that is still present in the connector flows back in the powder refilling container. Then the operator can safely remove the connector from the receiving area without any risk of powder falling around the tank. The risk is even weaker if the second end of the connector comprises a removable cover.

In the present invention the term "powder" covers a bulk material like powder, free flowing particles, pellets, granulates, granules, grains (like coffee beans) or leaves (like tea leaves). Preferably, the food or beverage powder can be instant or roast and ground coffee, chocolate, instant tea, milk powder, soup or a coffee mix.

In the present application the terms "downwardly", "upwardly", "internal", "external", "rear", "front", "bottom" and "lateral" are used to describe the relational positioning of features of the devices of the invention. These terms should be understood to refer to the different devices of the invention in their normal orientation during refilling operation, as far as the connector and the powder refilling container are concerned, and as positioned in a beverage preparation dispenser for the production of a beverage, as far as the tank is concerned, as shown in FIGS. 6, 7a to 7c, 8, 9a to 9c, 10 and 11.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures:

FIGS. 9a, 9b, 9c illustrate a system according to a second embodiment of the present invention.

DETAILED DESCRIPTION OF THE DRAWINGS

Figure 1A:
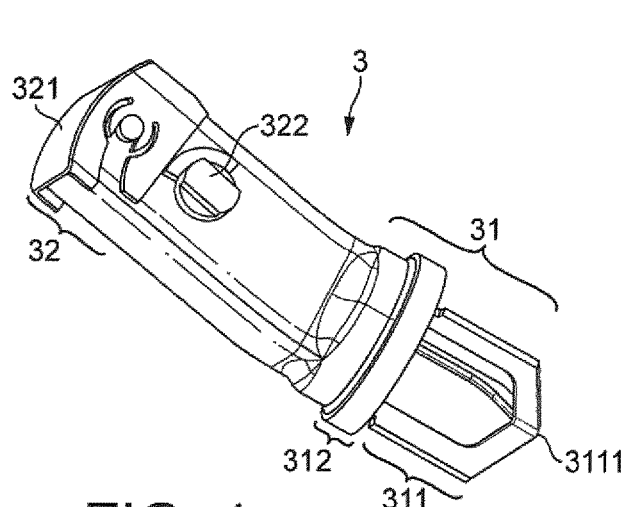
FIGS. 1a, 1b are perspective views of a connector according to the invention.
Figure 1B:
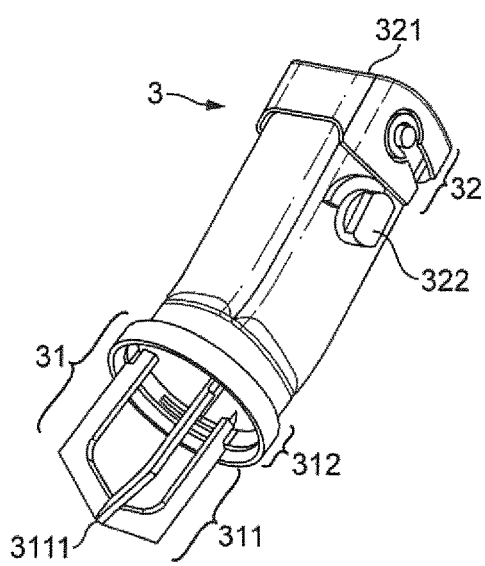

FIGS. 1a and 1b are different perspective views illustrating a connector 3 according to the invention. The connector is a tube enabling the flow of a powder from one first end 31 of the tube to the second end 32 of the tube.

The section of the tube can present any shape. This section is generally circular.

Figure 1C:
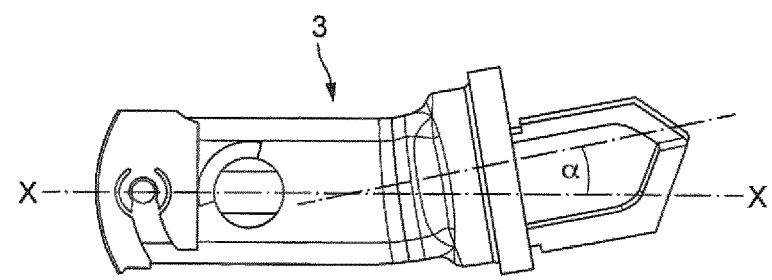
FIG. 1c is a side view of the connector of FIGS. 1a, and 1b.

The tube is preferably essentially straight. Yet as illustrated in the figures, the tube can be slightly angled near to the first end 31. In the illustrated embodiment, the first end 31 is oriented along a longitudinal axis deviating from the main longitudinal axis XX of the tube as illustrated in FIG. 1c according to a small angle α. The value of the angle depends on the powder refilling container to which the connector can be attached. This angle is optional.

Figure 4:
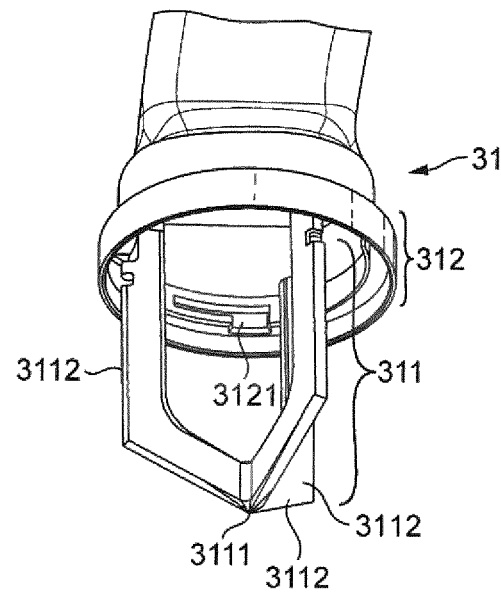
FIG. 4 is a detailed view of the first end of the tube of the connector of FIGS. 1a and 1b, FIGS. 5a to 5c illustrate the steps for connecting the connector to the pouch.

The first end 31 of the connector comprises a piercing portion 311. This piercing portion comprises a tip end 3111. The tip end is preferably sufficiently sharp for piercing the flexible wall of a pouch when this tip end 3111 is pushed against such a flexible wall. In the illustrated embodiment the piercing portion 311 comprises a tip end 3111 supported by three ribs 3112 elevating from the tube and joining at the tip end, more specifically illustrated in FIG. 4. This embodiment enables the tip end to pierce the flexible wall of a pouch without blocking the flow of powder within the tube once the connector is attached to the pouch.

Figure 1D:
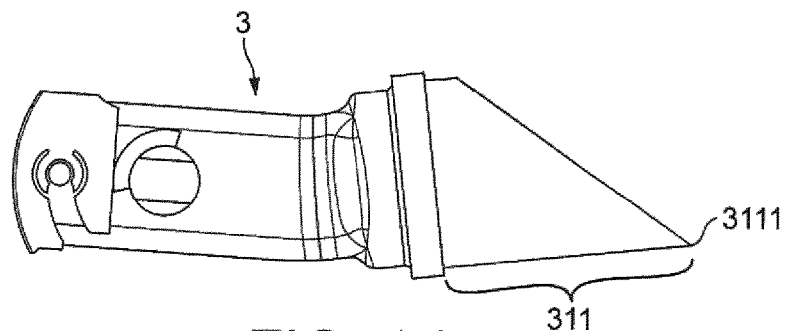
FIG. 1d is a side view of a connector with and an alternative piercing portion.

Other embodiments are possible for the piercing portion like a piercing end resulting from the oblique slicing of the tube first end a for example, as illustrated in FIG. 1d.

The first end 31 of the connector comprises an attaching portion 312 presenting a shape designed for cooperating with a corresponding attaching element of the flexible wall. In the illustrated embodiment the attaching portion 312 presents the shape of a ring, said ring presenting slots 3121 on its internal wall, more specifically illustrated in FIG. 4, for cooperation with bumps of the attaching element of the flexible wall.

Any other embodiment for cooperation between the first end of the connector and the attaching element of the refilling container can be implemented like inversion of bumps and slots between the two devices, screwing cooperation, snap-fitting.

The second end 32 of the connector is configured for being attached to the powder inlet of a storing tank as will be detailed later.

Figure 2A:
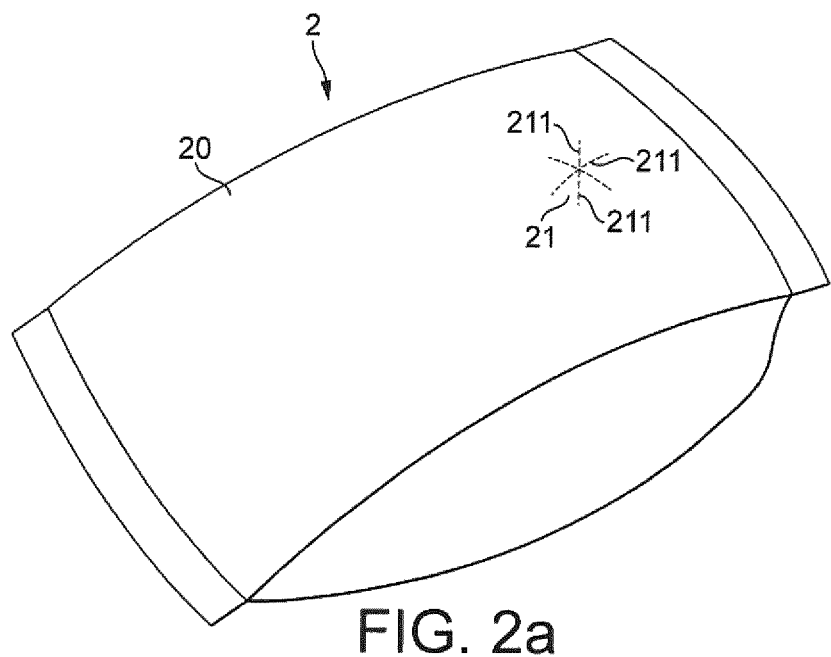
FIGS. 2a and 2b are respective perspective views of a pouch without an attaching element and with an attaching element according to the invention.

FIG. 2a illustrates a pouch of powder that can be used to refill the storing tank of a dispenser. This pouch if made of one flexible film material, usually folded and welded to form the pouch. According to a variant the pouch could present secondary walls that are not flexible. Preferably the pouch is only made of flexible walls. The pouch contents powder.

The flexible wall comprises a tearable area 21. This tearable area 21 is preferably positioned at a place on the flexible wall in order to enable a complete emptiness of the pouch once it is connected to the connector and to the tank of the beverage dispenser.

In the illustrated embodiment this tearable area 21 comprises weakening lines 211 extending radially from the centre of the area. These weakening lines 211 are configured for beginning tearing of the area 21 when the tip end of the connector is pushed against. These weakening lines 211 can be perforation or cutting lines in at least one of the layers the flexible wall is made of. When more than two lines are provided, they are preferably designed so as to cut at the same central point of the area.

These lines 211 provide a means for informing of the place to position the attaching element designed for cooperating with the connector.

Figure 2B:
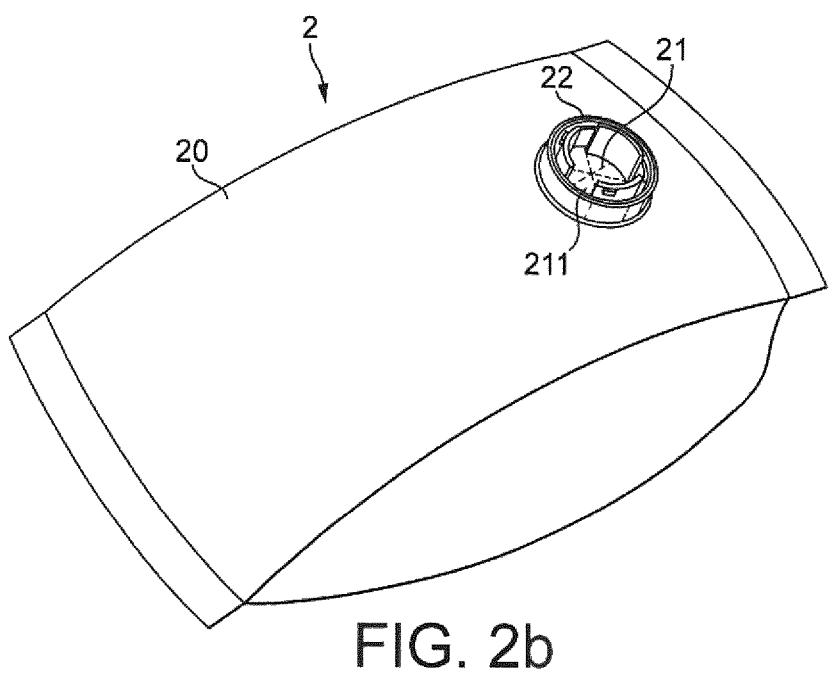

FIG. 2b illustrates a pouch whereon said attaching element 22 is present. It has been positioned around the tearable area 21.

Figure 3A:
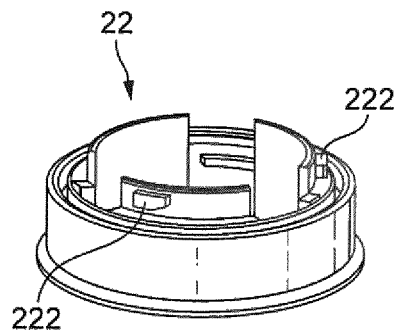
FIGS. 3a to 3c are various views of the attaching element of the pouch of FIG. 2b.
Figure 3B:
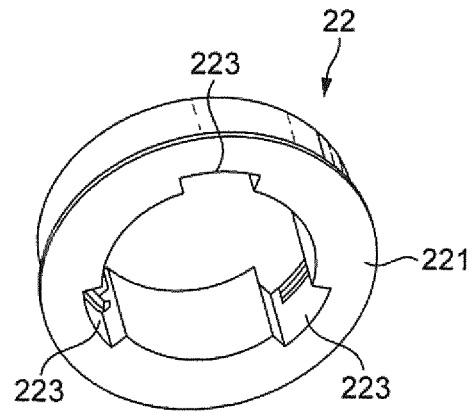
Figure 3C:
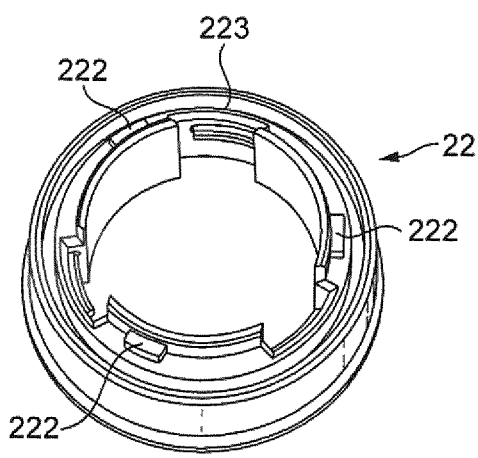

FIGS. 3a to 3c are different views of the attaching element 22. The attaching element 22 can be attached to the flexible wall by any manner like: gluing, heating, ultrasound welding, or other know means. Preferably the bottom surface 221 of said the attaching element is flat to enable the attachment and avoids any powder leaking during refilling.

In the illustrated embodiment the attaching element 22 is a ring. Yet other shapes can be implemented depending on the type of cooperation of said attaching element with the attaching portion of the first end of the connector. For example, if the cooperation is made by snap-fitting, the annular shape of a ring is not mandatory.

In the illustrated embodiment the attaching element 22 presents recesses 223 in the internal wall of the ring enabling the ribs 3112 of the piercing portion 311 of the connector to slide in the ring during the operation of piercing and attachment of the connector 3 to the pouch. The attaching element 22 presents bumps 222 in the internal wall of the ring enabling the ribs 3112 of the piercing portion 311 of the connector to cooperate with the slots 3121 in the attaching portion 312 of the connector. Accordingly once the connector has pierced the tearable area of the pouch, the connector can be attached to the attaching element 22 by rotating the connector within the ring.

This type of connection with bumps and slots enable a removable attachment of the connector to the flexible wall. Consequently it is possible to remove the connector 3 from the pouch 2 when said pouch is empty and to use the connector with another pouch.

The positions of the bumps and the slots can be designed so that only one type of first end of connectors can be attached to one type of attaching element on the pouch and so that one type of connector is dedicated to the refilling of one type of powder only.

Figure 5A:
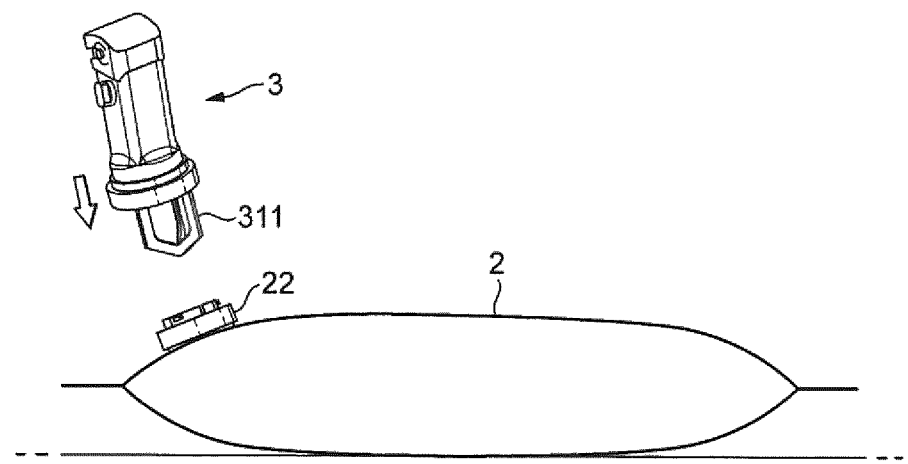
Figure 5B:
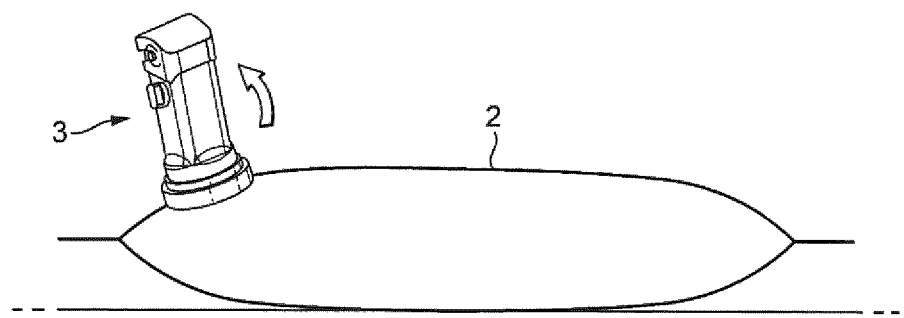
Figure 5C:
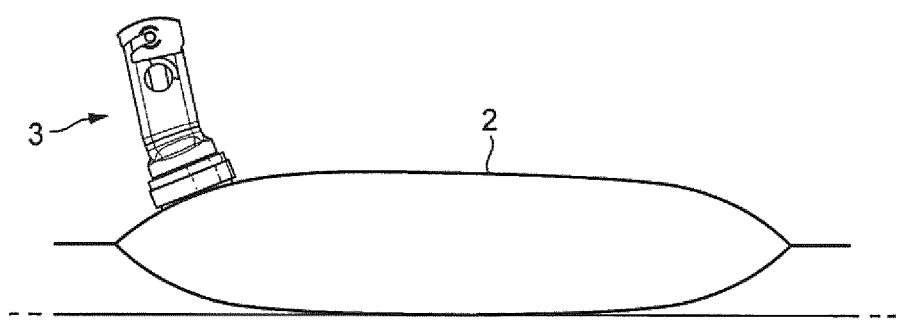

FIGS. 5a to 5c illustrate the successive steps for attaching the connector 3 to the pouch 2 provided with an attaching element 22. In a first step illustrated in FIG. 5a, the connector 3 is introduced in the attaching element 22 by pushing the piercing element 311 against the tearable area of the pouch inside the area defined by the attaching element 22.

In a second step illustrated in FIG. 5b, the connector is turned in order to make slots 3121 of the attaching portion of the connector and bumps 222 of the attaching element of the pouch cooperate together. FIG. 5c illustrates the pouch 2 with the connector 3 attached to and ready to refill a beverage dispenser tank.

Figure 6:
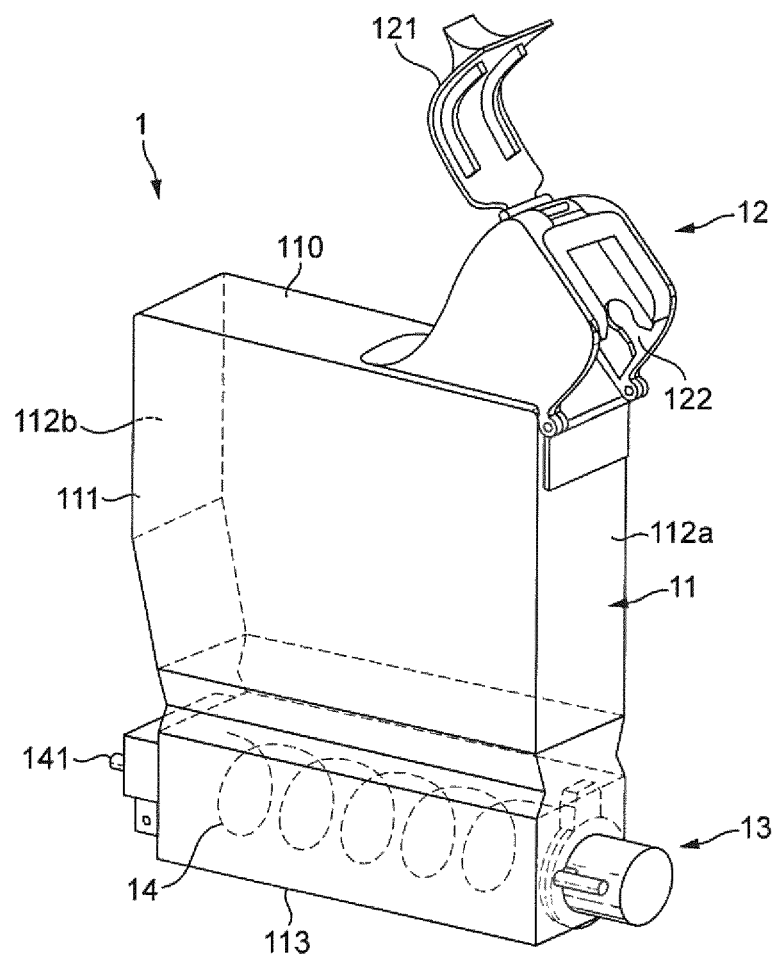
FIG. 6 is a view of a powder storing tank.

FIG. 6 illustrates a tank for storing powder 1. The container comprises a storing chamber 11 to store powder. The chamber 11 is closed at its top by a lid 110. The chamber 11 presents an essentially parallepipedal shape presenting two vertical lateral walls 111 and two vertical end walls, one rear front wall 112a and one rear end wall 112b. The chamber comprises an outlet that is a horizontal outlet duct 13 at the bottom 113 of the tank for evacuating the powder from the tank. The tank 1 comprises an endless screw 14 at the bottom 113 of the tank. The rotation of the screw 14 induces the movement of powder in direction of the outlet duct 13. The screw can be activated at its rear end by a shat that is part of the beverage dispenser.

The tank 1 comprises a powder inlet 12. The powder inlet 12 protrudes at the upper part of the tank. Preferably the powder inlet is attached to the top of the tank and is not removable therefrom, except for cleaning or maintenance. The powder inlet 12 comprises a movable cover 121 protecting the powder inlet 12 when the container is not refilled. The powder inlet comprises a receiving area 122 to receive the connector.

FIGS. 7a to 7e illustrates the cooperation between the tank 1 of a dispenser and the second end 32 of the connector, the first end of the connector having been already attached to a power pouch 2, as illustrated in FIGS. 5a to 5c. In these figures, the cooperation is made according to a first embodiment.

Figure 7A:
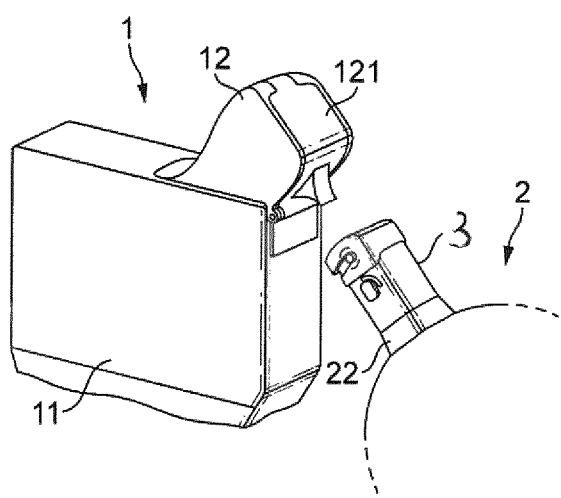
FIGS. 7a, 7b, 7c, 7d, 7e illustrate a system according to a first embodiment of the present invention.

As illustrated in FIG. 7a the tank 1 present a powder inlet 12 that protrudes at the upper part of the tank. The powder inlet 12 comprises a movable cover 121 protecting the powder inlet 12 when the container is not refilled.

Figure 7B:
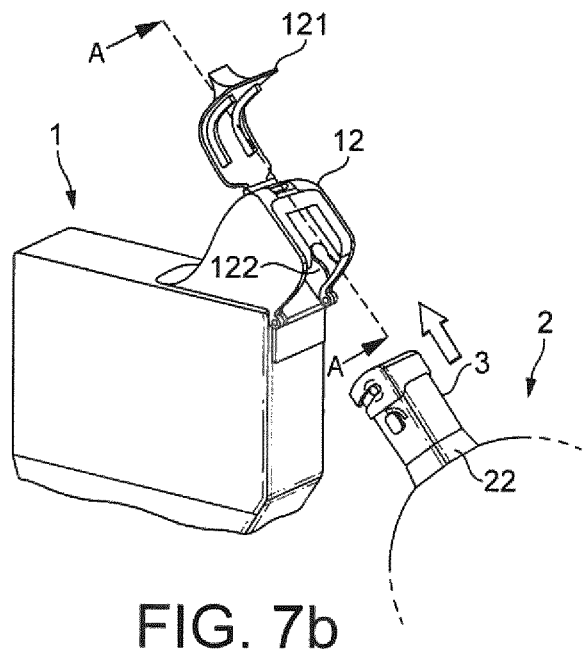

In FIG. 7b the cover 121 of the powder inlet of the tank has been removed to open the powder inlet 12. The powder inlet 12 comprises a receiving area 122 configured for receiving the second end 32 of the connector. The receiving area 122 is designed so as to receive the second end 32, the tube 3 of the connector being oriented upwardly. FIG. 7b illustrates how the operator must position the connector to be able to introduce it inside the receiving area 122 of the powder inlet: as illustrated the pouch and the connector must be hold so that the tube 3 is oriented upwardly and the pouch 2 is introduced according to an upwardly translation movement.

Figure 7C:
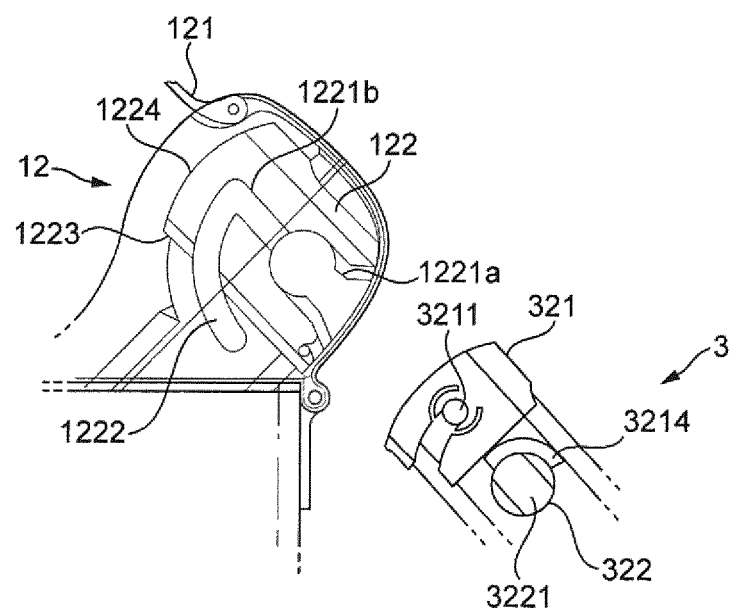
Figure 7D:
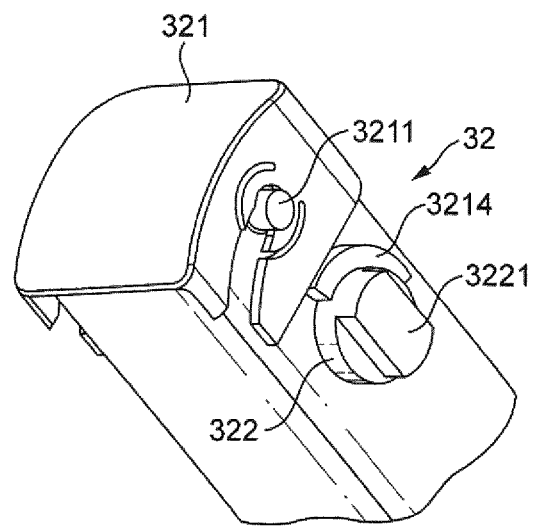

FIG. 7c is a side view of FIG. 7b showing a cross section of the powder inlet 12 according to AA in FIG. 7b (whereas the connector is represented according to a side view) and FIG. 7d is a perspective view of the connector second end 32 in the same upwardly position. The connector 3 comprises a first pair of symmetric pins 322 and a second pair of symmetric pins 3211 on its external lateral sides (in FIGS. 7c, 7d only one pin of each pair is apparent). Each pin 322 of the first pair of symmetric pins presents a bump 3221.

Figure 7E:
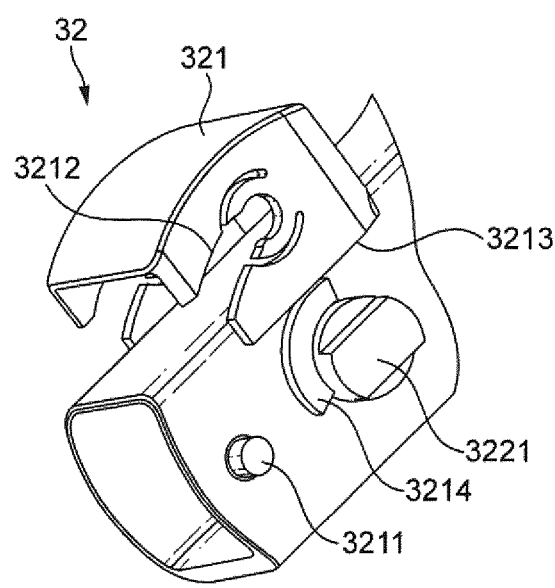

The connector comprises a cover 321 presenting a pair of symmetric guiding grooves 3212 on its external lateral sides (in FIGS. 7c, 7d only one groove of each pair is apparent)

and cooperating with the second pair of pins 3211 of the second end. The bottom edges 3213 of the lateral sides of the cover engage with symmetric cover guiding bumps 3214 on the external lateral sides of the second end. These guiding bumps guide the movement of the cover 321 when it is removed from the second end once the connector is moved to the second position inside the powder inlet of the container. FIG. 7e is an isolated perspective view of the tube 3 once positioned in said second position and illustrating the movement of the cover 321.

As shown in FIG. 7c, the receiving area 122 of the powder inlet 12 of the tank comprises a first guiding groove 1221a on its lateral internal wall cooperating with the tube guiding bumps 3221 on the lateral sides of the tube of the connector; a corresponding symmetric first guiding groove is present on the symmetric lateral internal wall (not represented due to the cross section). The receiving area 122 also comprises a second guiding groove 1221b on its lateral internal wall cooperating with the pin 3211 on the lateral side of the tube of the connector; the corresponding symmetric second guiding slot is present on the symmetric lateral internal wall (not represented due to the cross section).

Both first guiding slots 1221a and second guiding grooves 1221b of the receiving area present a straight design orientated upwardly in order to guide the introduction of the tube of the connector with the second end 32 of the tube orientated upwardly.

Accordingly the cooperation between the tube guiding bumps 3221 and second pair of pins 3211 of the connector with the first guiding grooves 1221a and the second guiding grooves 1221b respectively of the powder inlet enables guiding the introduction of the connector in the receiving area with:

the second end 32 of the connector being oriented upwardly, until the connector reaches the first position.

In the first position, the path of powder is closed, firstly, because the second end 32 is closed by the cover 321 and the cover abuts against the end wall 1224 of the receiving area and, secondly, because the outlet in the second end 32 faces the end wall 1224 of the powder inlet and becomes closed by said wall. Accordingly, even if the connector is deprived of cover, in this first position the second end is closed by the wall 1224 and no path for powder exists anyway. Moreover due to the upwardly position of the second end 32 of the tube, powder remains in the pouch 2 by gravity.

Once the tube is in the first position, the second pair of pins 3211 of the second end of the tube can cooperate with third guiding grooves 1222 present on the symmetric lateral internal wall (one of the pair is not represented due to the cross section). These third guiding grooves present a curved design so that the connector can be rotated in the receiving area. During the rotation, the cover 321 of the second end of the connector is retained by the lip 1223 within the receiving area and consequently a path for powder is created. During the removal of the cover, the pair of pins 3211 slide along the guiding grooves 1222 and the bottom guiding edge 3213 of the cover is guided along the cover guiding bump 3214 on the lateral side of the tube as illustrated in FIG. 7e. During the rotation the pin 322 is able to rotate in a corresponding round guiding groove of the receiving area.

Accordingly while moving to the second position, the second end 32 of the tube becomes oriented downwardly and the tube aligns itself on the internal tube of the powder inlet 12. Moreover, the cover is removed from the second end of the tube. As a consequence, a flow path is created for powder. Moreover, due to the new orientation of the tube, the operator is incited to move the pouch attached to the connector above the powder inlet so that powder can fill the tank 1 by gravity Consequently in this first embodiment, the connector is introduced in the powder inlet of the tank according to an upwardly translation up to the first position.

Different tanks 1 can be designed with slightly different design of guiding grooves 1221a, 1221b, 1222 so that only dedicated powder refilling containers 2 with corresponding designed pins 2111, 21112 and bumps 2113 are able to be engaged inside. For example the design can differ by the width, the length, the height, the position and/or the orientation of the grooves in the lateral walls of the receiving area 122. It becomes impossible for the operator to refill a container dedicated to coffee powder with a packaging containing milk powder for example.

Figure 8:
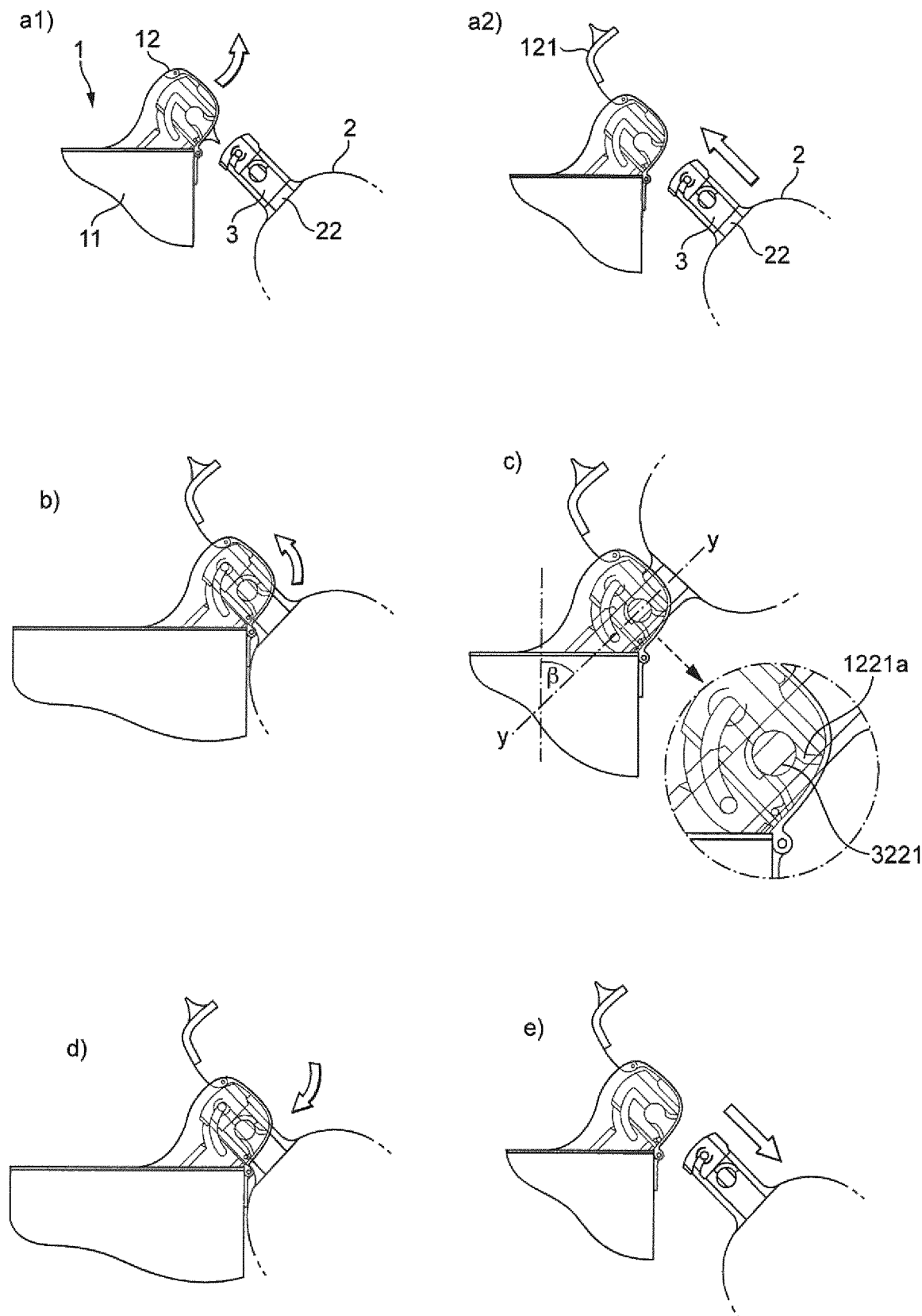
FIG. 8 illustrates the cooperation between the tank and the connector attached to the pouch of the system of the first embodiment.

FIG. 8 illustrates the steps of cooperation between the tank and the connector 3 attached to the pouch of the first embodiment of FIGS. 7a-7c.

In step a1), the cover 121 of the powder inlet of the tank is opened.

In step a2) the pouch 2 is moved with the second end 32 of the tube of the connector oriented upwardly and according to an upwardly translation within the powder inlet 21 of the tank until it teaches the first position of step b).

Between step b) and c) the pouch is rotated so as to reach the second position of step c): here the path for powder is created and refilling can happen. As illustrated in the magnified view of step c), the tube guiding bump 3221 is positioned transversely to the guiding groove 1221a of the receiving area meaning that in this second position the operator cannot remove the connector from the powder inlet of the tank without rotating back the connector. There is no risk that the operator lets powder flows out of the pouch by mishandling. He/she can even stop holding the pouch during the refilling, no mess is created around the tank since the connector remains attached to the powder inlet of the tank.

In step c), axis YY illustrates the orientation of the powder flow path created by the connector and the powder inlet of the tank. The flow path is inclined with respect to vertical according to an angle β. In the illustrated embodiment this angle is about 45°. This angle may vary according to the nature of the powder refilled in the tank, and in particular the flowability of the powder.

Between step c) and d) the connector is rotated back so as to reach again the first position of step d): here the path for powder is closed.

In step e), the connector can be removed from the receiving area, the second end of the connector being oriented upwardly.

This system guarantees that no powder can fall from the connector or the powder inlet during the refilling operation.

FIG. 9a illustrates the cooperation between the tank 1 of a dispenser and the second end 32 of the connector, the first end of the connector having been already attached to a power pouch 2. In these figures, the cooperation is made according to a second embodiment. The tank 1 comprises a powder chamber 11 and a powder inlet 12. The powder inlet 12 protrudes at the upper part of the tank. The powder inlet 12 comprises a movable cover 121 protecting the powder inlet 12 when the container is not refilled. A connector 3 is attached to the pouch 2.

In FIG. 9b the cover 121 of the powder inlet 12 of the tank has been removed to open the powder inlet. The powder inlet 12 comprises a receiving area 122 configured for receiving the connector 3. The receiving area 122 is designed so as to receive the second end 32, said second end being oriented upwardly. FIG. 9b illustrates how the operator must position the connector 3 to be able to introduce it inside the receiving area 122 of the powder inlet: as illustrated the packaging must be hold so that the second end 32 is oriented upwardly and the connector is introduced according to a downwardly translation movement (see arrow).

FIG. 9c is a side view of FIG. 9b showing a cross section of the powder inlet 12 according to AA in FIG. 9b (whereas the connector is represented according to a side view). The tube of the connector comprises a first pair of symmetric pins 322 and a second pair of symmetric pins 3211 on its external lateral sides (in FIGS. 9c only one pin of each pair is apparent). Each pin 322 of the first pair of symmetric pins presents a bump 3221.

The second end 32 of the connector comprises a cover 321 presenting a pair of symmetric guiding grooves on its external lateral sides (in FIG. 9c only one groove of each pair is apparent) and cooperating with the second pair of pins 2112 of the connector.

The receiving area 122 of the powder inlet 12 of the tank comprises a first guiding slot 1221a on its lateral internal wall cooperating with the tube guiding bumps 3221 on the lateral sides of the tube of the connector; a corresponding symmetric first guiding slot is present on the symmetric lateral internal wall (not represented due to the cross section). These guiding slots 1221a in the receiving area present a straight design for guiding the translation movement of the operator when he/she introduces the powder outlet of the packaging in the receiving area with the second end 32 of the connector orientated upwardly.

Accordingly the cooperation between the tube guiding bumps 3221 with the guiding grooves 1221a of the powder inlet enables guiding the introduction of the powder outlet in the receiving area with:
the second end 32 of the tube being oriented upwardly, until the connector reaches the first position.

In the first position the path of powder is closed since the second end 32 is closed by the cover 321 and the cover abuts against the end wall 1224 of the receiving area.

Once the connector is in the first position, the second pair of pins 3211 of the tube can cooperate with second guiding grooves 1222 present on the symmetric lateral internal wall of the receiving area (one of the pair is not represented due to the cross section). These second guiding grooves present a curved design so that the tube of the connector can be rotated in the receiving area. During the rotation, the front edge 3215 of the cover of the powder outlet is retained by the lip 1223 within the receiving area and a path for powder is created. During the removal of the cover, the pins 3211 slide along the respective guiding grooves 1222. During the rotation the pin 322 is able to rotate in a corresponding round guiding groove of the receiving area.

Accordingly while moving to the second position, the second end 32 of the tube becomes positioned downwardly and the cover is removed from said end of the tube. As a consequence, a flow path is created for powder and powder can fill the tank.

Consequently in this second embodiment, the system enables the introduction of the connector in the powder inlet of the tank according to a downwardly translation down to the first position.

Figure 10:
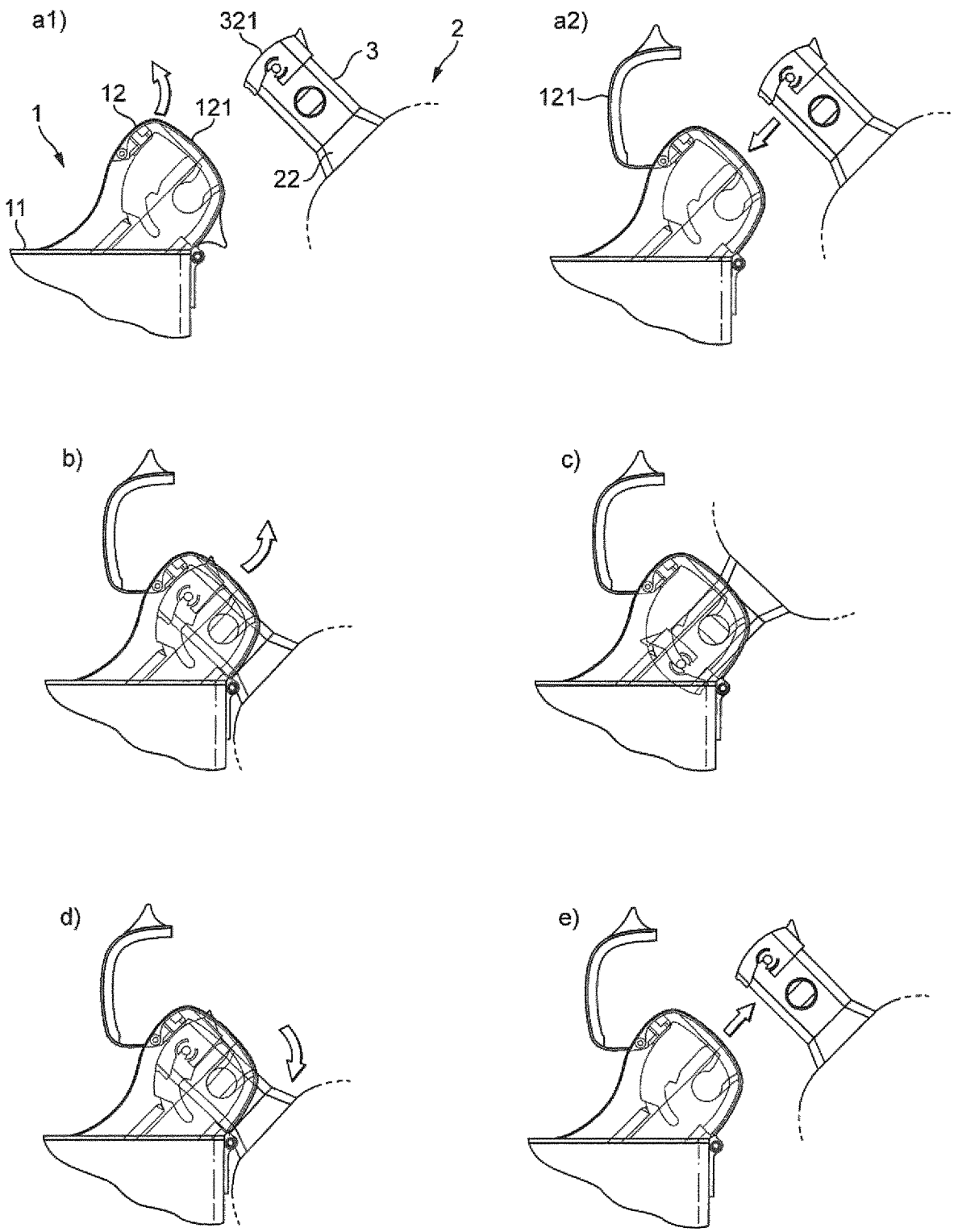
FIG. 10 illustrates the cooperation between the tank and the connector attached to the pouch of the system of the second embodiment.

FIG. 10 illustrates the steps of cooperation between the tank 1 and the connector 3 attached to the pouch of the second embodiment of FIGS. 9a-9c.

In step a1), the cover 121 of the powder inlet of the tank is opened.

In step a2) the pouch 2 is moved with the second end 32 of the connector oriented upwardly and according to a downwardly translation within the receiving area of the tank until it reaches the first position of step b).

Between step b) and c) the connector is rotated in a vertical plane so as to reach the second position of step c): here the path for powder is created and refilling occurs.

Between step c) and d) the connector is rotated back so as to reach again the first position of step d): here the path for powder is closed.

In step e), the connector can be removed from the receiving area, the second end 32 being oriented upwardly.

This system guarantees that no powder can fall from the connector or the tank powder inlet during the refilling operation.

Figure 11:
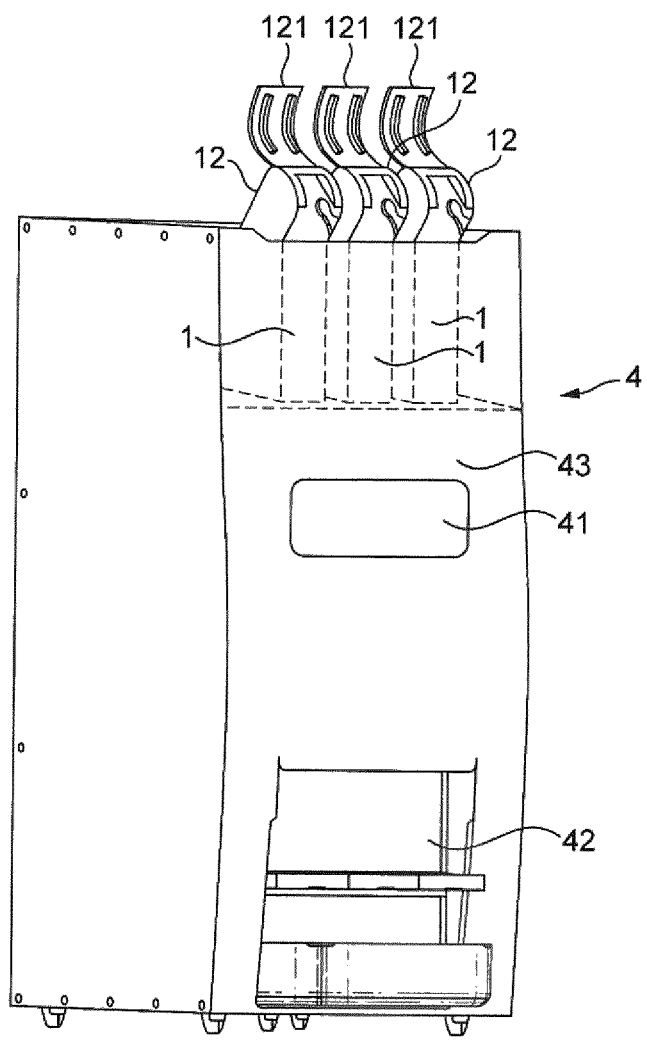
FIG. 11 illustrates a beverage dispenser according to the present invention.

FIG. 11 illustrates a beverage dispenser 4 comprising several beverage powder tanks 1 according to the invention. The tanks are positioned so that the powder inlets 12 are in the front of the dispenser, preferably at the upper part of the dispenser. Accordingly the operator can have direct access to the powder inlets 12 without opening the front door 43 of the dispenser. He/she just has to open the covers 121 of the powder inlets 12. Then the operator does not have to remove the container form the dispenser for refilling. This operation is usually mandatory in current dispensers because there is a risk that the operator dirties the machine with powder during refilling. But in the present invention there is no such risk.

Behind the front door 13, the dispenser usually comprises beverage preparation units placed under powder tanks 1. The outlets of the containers are oriented so as to deliver the beverage powder in the beverage preparation for contacting a dose of beverage powder with a diluent. The diluent is supplied by a fluid system comprising usually a boiler, a pump and a heater placed in the back part of the dispenser (not illustrated). The beverage preparation unit 21 delivers the beverage in a cup placed in a dispensing area 42.

The dispenser usually comprises an input device 41 for enabling a customer to select and order a beverage.

The tanks 1 can cooperate with motor shafts at their rear end in order to actuate the dosing devices inside the containers.

Advantageously it is possible to retrofit existing powder tanks for storing a food or beverage powder of existing dispensers by simply removing the lid and replacing it with a lid comprising a receiving area in order to cooperate with a connector for refilling. Eventually the front door of the dispenser may be adapted too.

The system of the present invention presents the advantage of enabling the movement of the connector attached to the pouch in the powder inlet of the tank. Yet the system does not comprises any moving part, the system only induces the operator to make the right movement to orientate the connector and the pouch in a manner that avoids any spilling of powder.

Although the invention has been described with reference to the above illustrated embodiments, it will be appreciated that the invention as claimed is not limited in any way by these illustrated embodiments. As an example, the powder refilling container may not be limited to a pouch or the presence of a cover at the powder inlet of the tank is not mandatory Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS tank 1
storing chamber 11
   lid 110
   lateral wall 111
   rear front wall 112*a*
   rear end wall 112*b*
   bottom 113
powder inlet 12
   cover 121
   receiving area 122
      guiding groove 1221*a*, 1221*b*, 1222
      retaining means, lip 1223
      end wall 1224
powder outlet 13
endless screw 14
   rear end 141
pouch 2
tearable area 21
   weakening lines 211
attaching element 22
bottom surface 221
bump 222
recess 223
connector 3
first end 31
   piercing portion 311
      tip end 3111
      ribs 3112
   attaching portion 312
      slot 3121
second end 32
   cover 321
      pin 3211
      groove 3212
      bottom edge 3213
      guiding bump 3214
      front edge 3215
   pin 322
      bump 3221
dispenser 4
input device 41
dispensing area 42
front side 43

The invention claimed is:

1. A connector for connecting a powder refilling container comprising at least one flexible wall with a storing powder tank of a beverage preparation machine wherein the connector is a tube, the tube presenting two ends,
   a first end is configured for piercing the at least one flexible wall of the powder refilling container and is further configured to attach to the at least one flexible wall,
   a second end is configured for introduction in a receiving area of a powder inlet of the storing powder tank, and wherein an external wall of the tube comprises at least one guiding groove and/or pin designed for guiding the tube in the receiving area of the powder inlet of the storing powder tank and for moving the tube in the receiving area.

2. The connector according to claim 1, wherein the at least one flexible wall comprises an attaching element configured for cooperating with the first end, and the first end comprises an attaching portion presenting a shape designed for cooperating with the attaching element.

3. The connector according to claim 1, wherein the second end of the tube of the connector is further configured:
   for being movable within the receiving area in order to be positioned relatively to the powder inlet of the storing powder tank in at least two positions:
   a first position in which the second end of the tube is oriented upwardly, and
   a second position in which the second end of the tube is oriented downwardly.

4. The connector according to claim 3, wherein the second end comprises a mechanical shape for enabling:
   introduction of the second end of the tube in the receiving area of the storing powder tank to the first position; and
   rotational movement of the second end of the tube from the first to the second position.

5. The connector according to claim 1, wherein the external wall of the tube comprises two pairs of symmetric pins.

6. A powder refilling container made of at least one flexible wall and connectable to a connector comprising a storing powder tank of a beverage preparation machine wherein the connector is a tube, the tube presenting two ends, a first end is configured for piercing the at least one flexible wall of the powder refilling container and further configured to attach to the at least one flexible wall, and a second end configured for introduction in a receiving area of a powder inlet of the storing powder tank, wherein an external wall of the tube comprises at least one guiding groove and/or pin designed for guiding the tube in the receiving area of the powder inlet of the storing powder tank and for moving the tube in the receiving area,
   the at least one flexible wall comprising a tearable area,
   the powder refilling container comprising an attaching element configured for cooperating with the first end of the connector, the attaching element surrounding the tearable area of the at least one flexible wall, and
   the powder refilling container containing powder.

7. The powder refilling container according to claim 6, wherein the attaching element is a ring, a bottom surface of the ring is sealed to the at least one flexible wall in order to surround the tearable area, and the ring is configured for cooperating with the first end of the connector.

8. A beverage dispenser comprising at least one tank for storing food or beverage powder, the tank being connectable to a connector, wherein the at least one tank comprises a powder inlet wherein the connector is a tube, the tube presenting two ends, a first end being is configured for piercing at least one flexible wall of a powder refilling container and is further configured for attachment to the at least one flexible wall, and a second end is configured for introduction in a receiving area of a powder inlet of the storing powder tank, is configured so that the tube of the connector is able to be moved within the receiving area in order to be positioned relatively to the powder inlet of the at least one tank in at least two positions:
   a first position in which the second end of the tube is oriented upwardly; and
   a second position so that the second end of the tube is oriented downwardly, and
   wherein an external wall of the tube comprises at least one guiding groove and/or pin designed for guiding the tube in the receiving area of the powder inlet of the at least one tank and for moving the tube in the receiving area.

9. The beverage dispenser according to claim 8, wherein the receiving area of the tank is a socket comprising internal walls, the internal walls of the socket comprising at least one guiding pin and/or groove for cooperation with at least one corresponding guiding groove and/or pin on the external wall of the second end of the tube of the connector.

10. The beverage dispenser according to claim 8, wherein the beverage dispenser comprises at least two tanks storing different powders and receiving areas of powder inlets of the at least two tanks are designed differently for receiving different connectors connected to different refilling containers storing different powder refilling containers.

11. The connector according to claim 1, wherein the connector further comprises a removable cover above the second end of the tube.

12. The connector according to claim 11, wherein the powder inlet of the storing powder tank is configured to remove the removable cover.

\* \* \* \* \*